(12) United States Patent
Oh et al.

(10) Patent No.: US 9,994,197 B2
(45) Date of Patent: Jun. 12, 2018

(54) CAR CLEANER

(71) Applicants: GNST CO., LTD., Gwangju (KR); Hyung Jong Oh, Gwangju (KR)

(72) Inventors: Hyung Jong Oh, Gwangju (KR); Jae Seung Cho, Gwangju (KR); Nam In Jeong, Gwangju (KR); Hye Sun Song, Gwangju (KR)

(73) Assignee: NAMDO MOLD CO., LTD., Gwangju (KR)

( * ) Notice: Subject to any disclaimer, the term of this patent is extended or adjusted under 35 U.S.C. 154(b) by 318 days.

(21) Appl. No.: 14/675,812

(22) Filed: Apr. 1, 2015

(65) Prior Publication Data

US 2015/0283979 A1    Oct. 8, 2015

(30) Foreign Application Priority Data

Apr. 3, 2014 (KR) .................. 10-2014-0040117
Jun. 11, 2014 (KR) .................. 10-2014-0071101
Jun. 24, 2014 (KR) .................. 10-2014-0077152

(51) Int. Cl.
*B60S 3/00* (2006.01)
*A47L 7/00* (2006.01)
*A47L 5/14* (2006.01)

(52) U.S. Cl.
CPC .............. *B60S 3/008* (2013.01); *A47L 5/14* (2013.01); *A47L 7/0076* (2013.01)

(58) Field of Classification Search
None
See application file for complete search history.

(56) References Cited

U.S. PATENT DOCUMENTS

| | | | | |
|---|---|---|---|---|
| 3,619,851 A * | 11/1971 | Bolzan | .................... | A47L 5/362 |
| | | | | 15/323 |
| 4,817,230 A * | 4/1989 | Kiyooka | .................. | A47L 5/14 |
| | | | | 15/330 |
| 6,141,824 A * | 11/2000 | Fujiwara | ................ | A01G 1/125 |
| | | | | 15/330 |
| 2002/0108207 A1* | 8/2002 | Oohama | ................... | A47L 5/14 |
| | | | | 15/330 |
| 2004/0250373 A1* | 12/2004 | Rew | ......................... | A47L 9/00 |
| | | | | 15/330 |

* cited by examiner

*Primary Examiner* — Christopher M Koehler
*Assistant Examiner* — Brian Keller
(74) *Attorney, Agent, or Firm* — Lex IP Meister, PLLC (57) ABSTRACT

The car cleaner includes a collecting part having a collecting space to collect dust or foreign substances; a suction/discharge pipe of which one side is coupled with the collecting part to be in communication therewith, and which has a suction and spray nozzle configured to transfer the dust or the foreign substances in the car to the collecting part; a vacuum suction unit having a sucking part connected with the collecting part and a discharging part configured to discharge sucked air; an external air suction switching unit installed between the collecting part and the sucking part of the vacuum suction unit so that air in the collecting part or external air is selectively sucked into the sucking part; and a suction/discharge switching unit provided so that air discharged through the discharging part is discharged through the suction/discharge pipe.

1 Claim, 10 Drawing Sheets

CAR CLEANER

CROSS-REFERENCE TO RELATED APPLICATION

This application claims priority to and the benefit of Korean Patent Application Nos. 10-2014-0040117, filed on Apr. 3, 2014, 10-2014-0071101, filed on Jun. 11, 2014 and 10-2014-0077152, filed on Jun. 24, 2014 the disclosure of which is incorporated herein by reference in its entirety.

BACKGROUND

1. Field of the Invention

The present invention relates to a car cleaner, and more particularly, to a car cleaner which is capable of sucking dust with a strong suction force and discharging high pressure air with a strong blowing force.

2. Discussion of Related Art

A cleaner for cleaning an inner side of a car includes a large-sized vacuum cleaner which is driven by a separate power source supplied from an outside, a rechargeable vacuum cleaner which is easy to carry, and a portable cleaner which is driven using a power source of the car.

The above-described cleaners suck foreign substances, which contaminate an inner side of the car, using a vacuum suction force.

In Korean Patent Publication No. 96-37440, there is disclosed a vacuum cleaner for a car. The vacuum cleaner for the car includes a suction hood which sucks dust, a suction hood interface which has a built-in dust filter and in which the suction hood is inserted, and a suction hose which connects the suction hood interface to an internal air port.

In Korean Patent Publication No. 1999-0033822, there is disclosed a vacuum cleaner embedded in a seat of a car, and Korean Patent Publication No. 2007-0049793 discloses a vacuum cleaner which sprays compressed air.

These conventional vacuum cleaner have a function which vacuum-sucks or sprays air. There is a problem in that suction and vibration may not be used compatibly.

In U.S. Patent Publication No. 2010/0083457 A1, there is disclosed a car vacuum cleaner.

SUMMARY OF THE INVENTION

The present invention is directed to a car cleaner which is capable of sucking dust or foreign substances which contaminate an inner side of the car, and also blowing and effectively removing the dust accumulated at a corner or in a gap.

Also, the present invention is directed to a car cleaner having a relatively simple structure which is installed at the inner side of the car to suck or spray air, thereby changing an air flow and thus removing the foreign substances contaminating the inner side of the car.

According to an aspect of the present invention, there is provided a car cleaner including a collecting part having a collecting space coupled with a main body of the cleaner to collect dust or foreign substances; a suction/discharge pipe of which one side is coupled with the collecting part to be in communication therewith, and which has a suction and spray nozzle configured to transfer the dust or the foreign substances in the car to the collecting part; a vacuum suction unit having a sucking part connected with the collecting part to provide a suction force to the collecting part and a discharging part configured to discharge sucked air; an external air suction switching unit installed between the collecting part and the sucking part of the vacuum suction unit so that air in the collecting part or external air is selectively sucked into the sucking part; and a suction/discharge switching unit provided so that air discharged through the discharging part is discharged to an outside through at least a part of the suction/discharge pipe.

The car cleaner may further include a switching valve provided at the discharging part to discharge the air sucked through the suction/discharge pipe to the outside, or to supply the discharged air toward the suction/discharge switching unit through a discharging port and a first connection duct.

The car cleaner may further include a bypass passage configured to bypass the air discharged from a side adjacent to the discharging part of the vacuum suction unit to the outside.

According to another aspect of the present invention, there is provided a car cleaner including a collecting part having a collecting space coupled with a main body of the cleaner to collect dust or foreign substances; a suction/discharge pipe of which one side is coupled with the collecting part to be in communication therewith, and which has a suction and spray nozzle configured to transfer the dust or the foreign substances in the car to the collecting part; a vacuum suction unit having a sucking part connected with the collecting part to provide a suction force to the collecting part and a discharging part configured to discharge sucked air; and a suction/discharge switching unit provided so that air discharged through the discharging part is discharged through the suction/discharge pipe.

The suction/discharge switching unit may include a first connection duct configured to connect the discharging part and the suction/discharge pipe, and a 4-way switching valve installed at a connection portion between the first connection duct and the suction/discharge pipe so that the air sucked through the suction/discharge pipe and then passing through the first connection duct is discharged to the outside, or external air introduced through the external air suction switching valve is discharged through the suction/discharge pipe.

According to still another aspect of the present invention, there is provided a car cleaner including a collecting part having a collecting space coupled with a main body of the cleaner to collect dust or foreign substances; a suction pipe of which one side is coupled with the collecting part to be in communication therewith, and which has a suction and spray nozzle configured to transfer the dust or the foreign substances in the car to the collecting part; a vacuum suction unit having a sucking part connected with the collecting part to provide a suction force to the collecting part and a discharging part configured to discharge sucked air; and a switching unit connected with the discharging part so that the discharged air is selectively discharged to an outside or a discharging pipe.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

A car cleaner in accordance with the present invention provides an air suction force which sucks foreign substances to perform a cleaning operation, and an air spray force which blows away the foreign substances, and one embodiment thereof is illustrated in FIGS. 1 to 4.

Referring to the drawings, the car cleaner 10 of the present invention includes a collecting part 20 which has a collecting space coupled with a main body of the cleaner to collect dust or foreign substances, a suction/discharge pipe 30 to which one side of the collecting part 20 is coupled so as to be in communication therewith, and which has a suction and spray nozzle 31 for transferring the dust or the foreign substances in the car to the collecting part 20, and a vacuum suction unit 40 having a sucking part 41 which is connected with the collecting part 20 to provide a suction force to the collecting part 20 and a discharging part 42 which discharges sucked air. An external air suction switching unit 50 which is disposed between the collecting part 20 and the sucking part 41 of the vacuum suction unit 40 to selectively suck air in the collecting part 20 or external air to the sucking part 41 of the vacuum suction unit 40 is provided, and also a suction/discharge switching unit 60 which is interlocked with the external air suction switching unit 50 so as to discharge the air discharged through the discharging part 42 via an external part and at least a part of the suction/discharge pipe 30 is provided.

Each element of a structure of the car cleaner 10 in accordance with the present invention as described above will be described in detail.

The car cleaner 10 in accordance with the present invention is installed at an inner wall of an inner side of the car in a built-in type, and may be installed at the inner wall of a truck side of the car. The collecting part 20 of the car cleaner installed at the inner wall of the car may be coupled to and separated from a main body (not shown) of the cleaner, and includes a collecting case 21 which collects and stores the foreign substances contaminating the inner side of the car, and a mesh member 22 which is installed at an inner side of the collecting case 21 to prevent the foreign substances from being moved along with the sucked air to a filter side, and a filter 23 which is disposed above the mesh member 22 to collect fine dust from the air passing through the mesh member 22 and introduced toward the sucking part 41 of the vacuum suction unit 40. A shape of the collecting part 20 having the above-described structure is not limited to the embodiment, and it is satisfied as long as the present invention has a structure capable of collecting the foreign substances and the dust contained in the air sucked through the suction/discharge pipe 30. The present invention may use the principle of cyclone or may have a multi-stage collecting structure according to a design of the collecting part.

The suction/discharge pipe 30 may be manufactured of a flexible bellows pipe so as to reduce a space occupation and to be easily deformed when a cleaning operation is performed.

The suction and spray nozzle 31 is formed in a tubular shape to suck the air or to blow away the foreign substances, thereby performing the cleaning operation. Also, although not shown in the drawings, a brush may be installed at an end thereof. The suction and spray nozzle 31 may have a throttling part of which a cross sectional area is relatively reduced. A suction nozzle which sucks the air to perform the cleaning operation and a discharge nozzle which sprays the air may be selectively coupled to an end of the suction/discharge pipe 30 according to a condition of the cleaning operation.

The vacuum suction unit 40 serves to provide an air suction force and an air discharge force for air spraying to the suction/discharge pipe 30. The vacuum suction unit 40 includes a housing 44 in which an impeller 43 is installed and the sucking part 41 is in close contact with the collecting part 20 or connected with the collecting part 20 through a connection duct 101 so as to suck the air through the filter 23 of the collecting part 20, and a motor 45 which is coupling with the housing 44 to rotate the impeller 43. The discharging part 42 which discharges the air sucked through the sucking part 41 of the housing 44 is formed at a motor housing 45a of the motor 45. The discharging part 42 which discharges the air sucked through the sucking part 41 of the vacuum suction unit 40 is provided at the motor housing 45a so that the air is moved via a rotor or a stator of the motor 45 to cool the motor 45 and then discharged. Also, as will be described in the next embodiment, a plurality of bypass passages 45b may be formed at the motor housing 45a so as to discharge some of the air sucked through the sucking part 41 (referring to FIG. 1).

The external air suction switching unit 50 includes a first switching valve 52 which is installed at the connection duct 101 configured to connect the sucking part 41 of the housing 44 with the collecting part 20 or installed at a branch duct 103 (referring to FIG. 3) connected with the connection duct 101, such that the air is sprayed through the suction/discharge pipe 30 and the suction and spray nozzle 31. The first switching valve 52 may be configured with a damper or a valve (a rotary valve or a butterfly valve) which controls a flow of the air. When the first switching valve 52 is installed at the connection duct 101, it may be a 3-way valve, and when the first switching valve 52 is installed at the branch duct 103, it may be a 2-way valve. The 2-way valve or 3-way valve may be formed to have a structure capable of securing a sufficient passage which is not interfered with the flow of the air.

Figure 1:
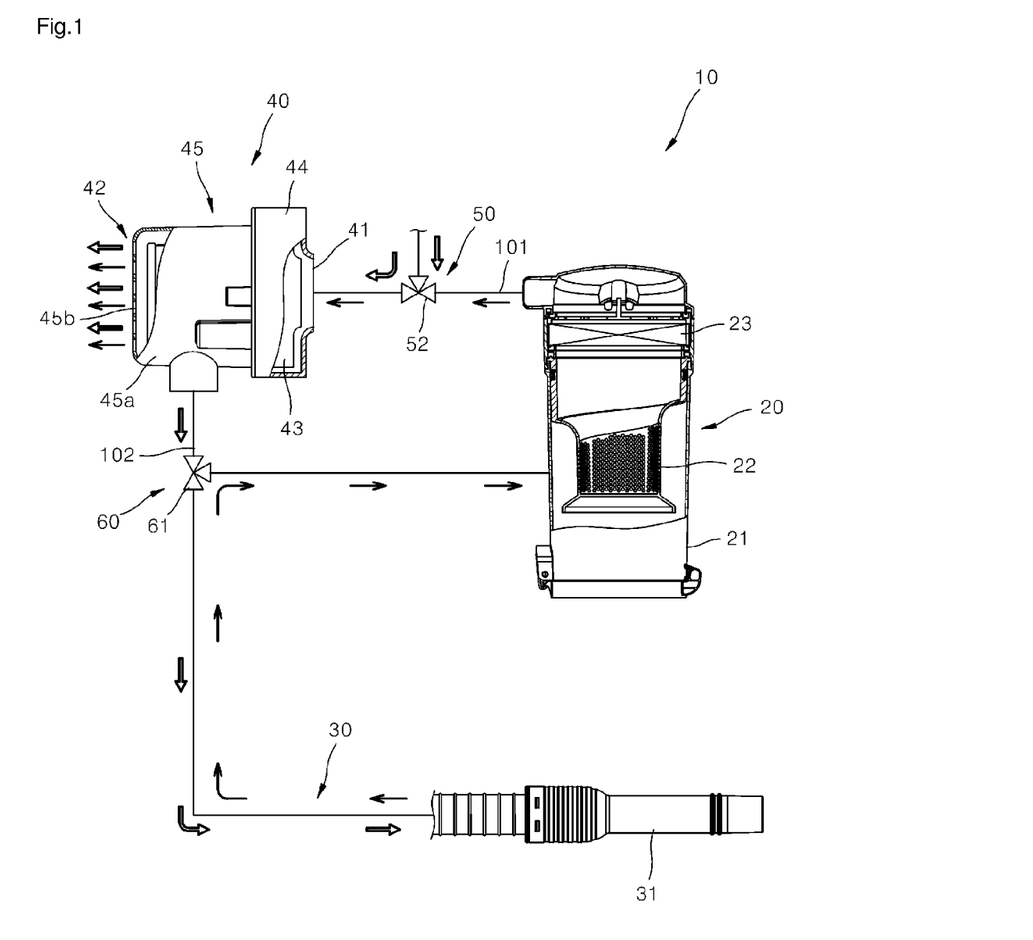
FIG. 1 is a view schematically illustrating a car cleaner in accordance with the present invention.

As illustrated in FIG. 1, the suction/discharge switching unit 60 serves to discharge the air through the suction/discharge pipe 30, and includes a first connection duct 102 which connects the discharging part 42 of the vacuum suction unit 40 with the suction/discharge pipe 30. A second switching valve 61 is installed at a connection portion thereof which connects the first connection duct 102 with the suction/discharge pipe 30. The bypass passages 45b are formed at the motor housing 45a. The second switching valve 61 may be configured with the 3-way valve.

In a vacuum suction mode (a mode in which the air is sucked through the suction/discharge pipe 30 to suck the foreign substances) in which the first connection duct 102 is blocked, the bypass passages 45b serve as passages through which the sucked air is discharged. In a discharging mode (a mode in which the air is discharged through the suction/discharge pipe 30), some of the air which does not pass through the first connection duct 102 is discharged therethrough.

Figure 2:
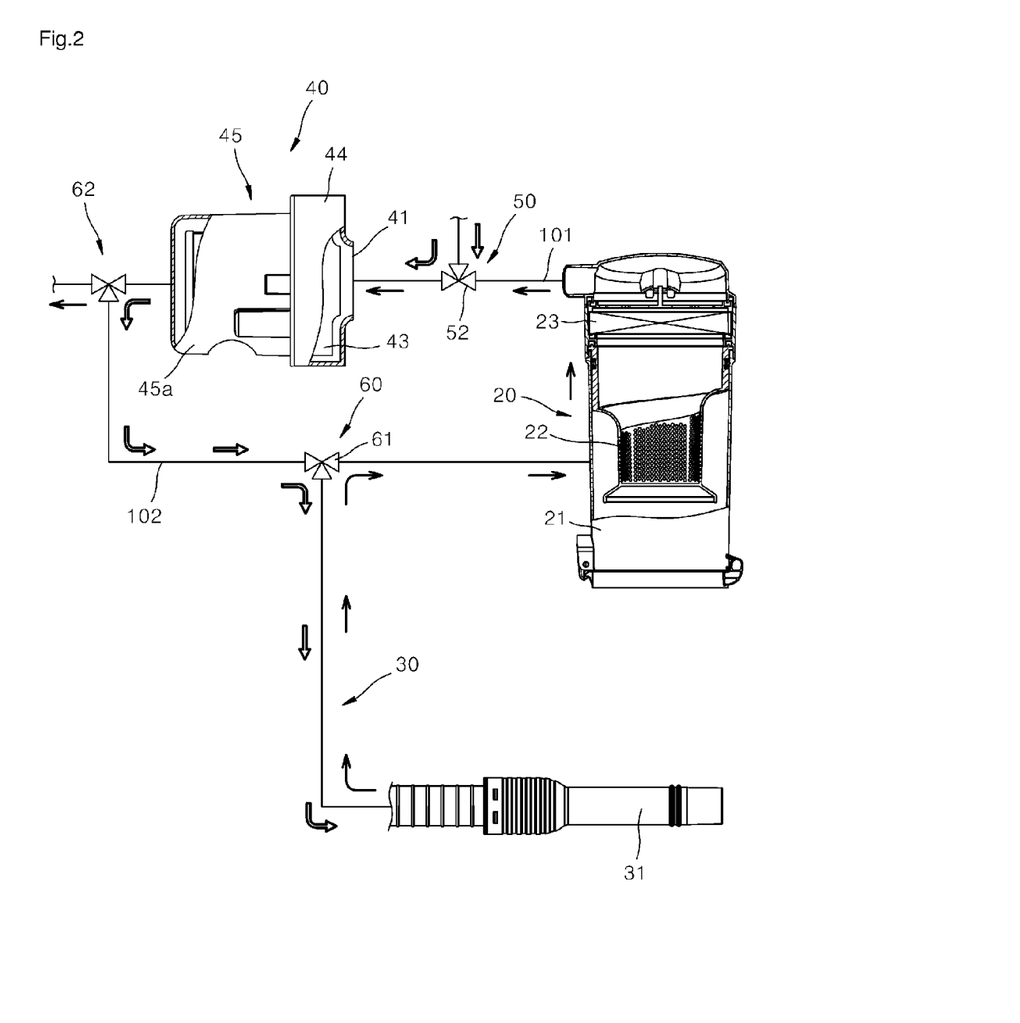
FIG. 2 is a view illustrating a car cleaner in accordance with another embodiment of the present invention.

As illustrated in FIG. 2, in another embodiment of the suction/discharge switching unit 60, a first connection duct 102 which connects the discharging part 42 with the suction/discharge pipe 30 is provided, and a second switching valve 61 is installed at a connection portion thereof which connects the first connection duct 102 with the suction/discharge pipe 30, and a third switching valve 62 which opens the discharging part 42 and so as to discharge the sucked air to the outside and thus to supply a vacuum pressure to the collecting part 20 or allows the air to flow to the first connection duct 102 is also provided.

Figure 3:
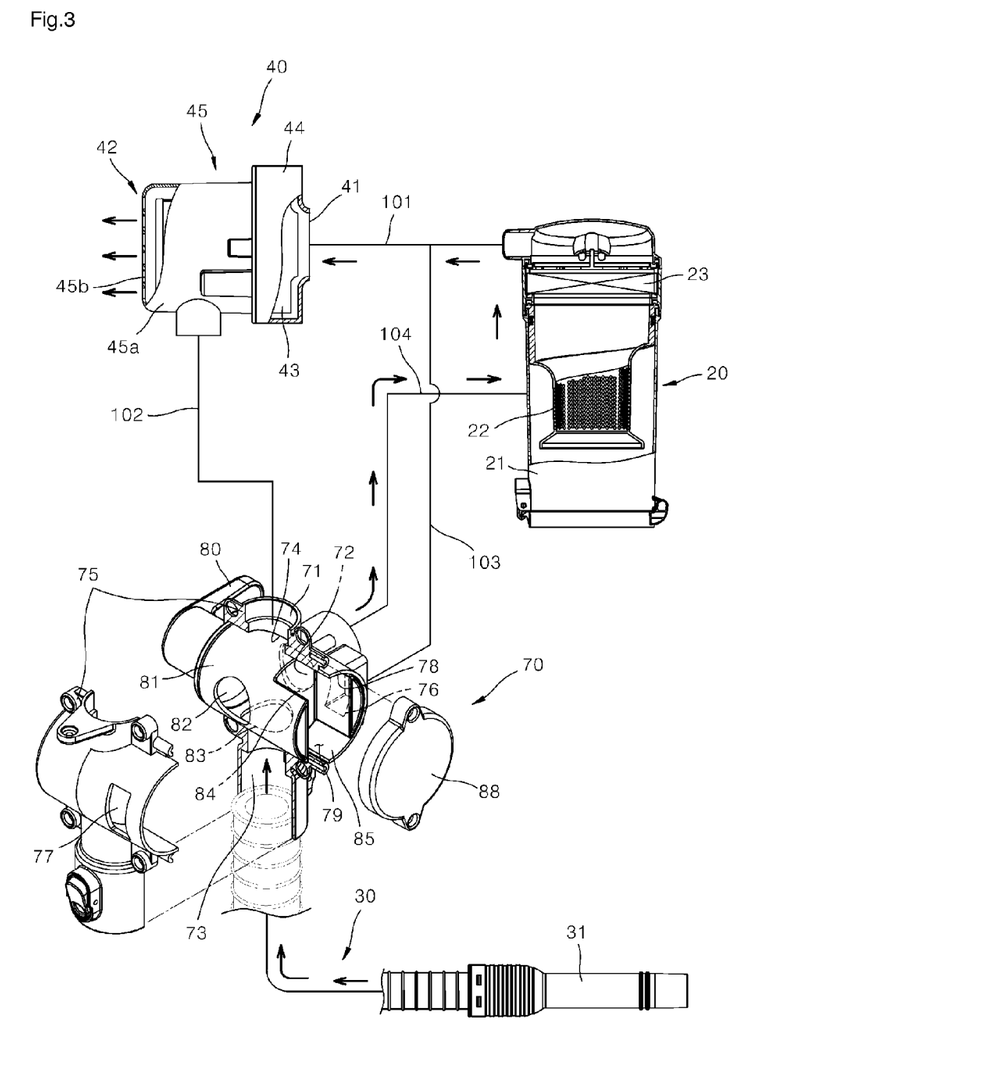
FIGS. 3 and 4 are views illustrating the car cleaner in accordance with the present invention, in which a complex switching unit having first and second switching units combined with each other is installed.
Figure 4:
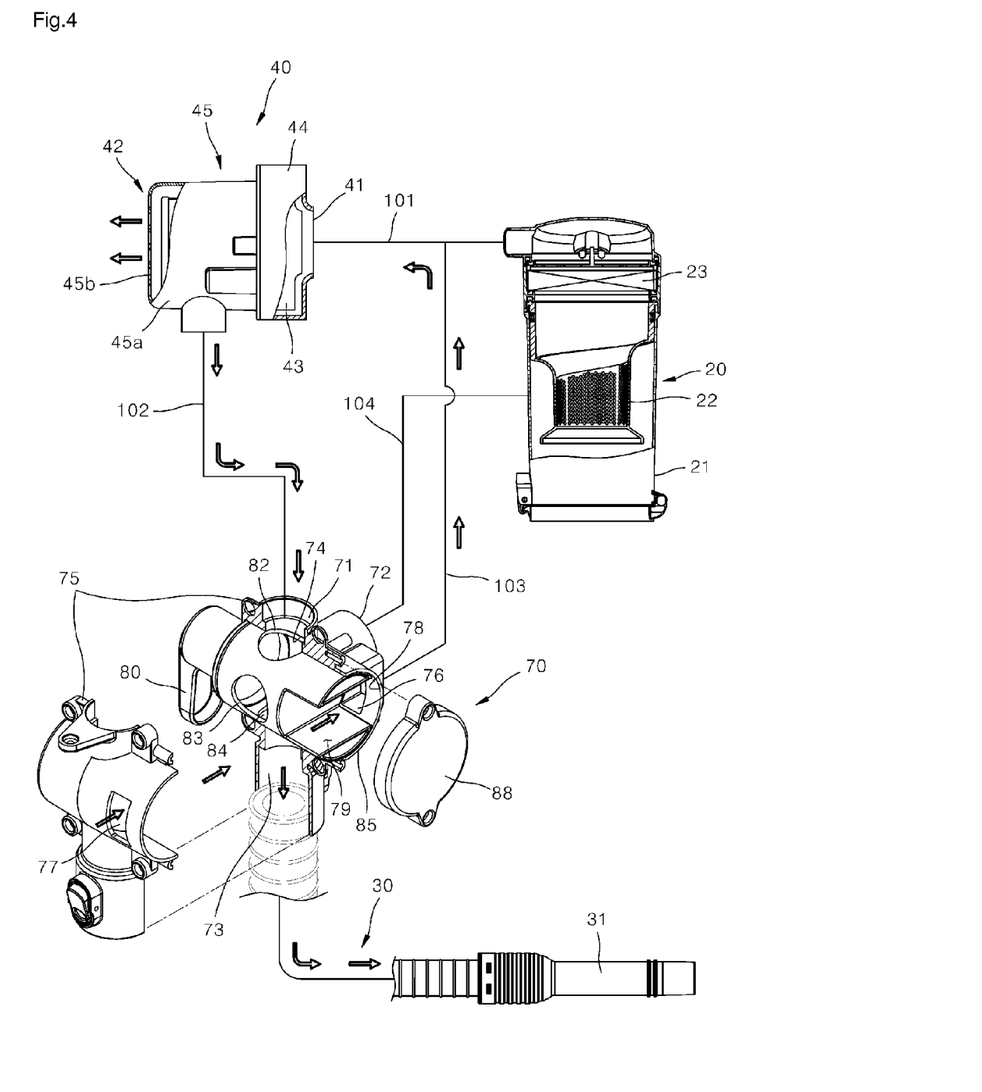

Here, as illustrated in FIGS. 3 and 4, the first switching valve and the second switching valve may be configured with a complex switching valve 70 which is capable of being operated by one operating lever or actuator.

The complex switching valve 70 includes a first connection passage 71 to which the first connection duct 102 connected with the discharging part 42 is connected, a second connection passage 72 to which a second connection duct 104 connected with the collecting part 20 is coupled, a third connection passage 73 connected with the suction/discharge pipe 30 in which the suction and spray nozzle 31 is installed, and a valve housing 75 having a first communication space 74 with which the first, second and third connection passages 71, 72 and 73 are in communication.

A fourth connection passage 76 to which the branch duct 103 connected with the connection duct 101 is coupled is formed at an end side of the valve housing 75, and a fifth connection passage 77 which is in communication with external air is formed at a side thereof corresponding to the fourth connection passage 76, and a second communication space 79 which connects the fourth and fifth connection passages 76 and 77 are also formed.

A rotor 81 which is rotated at a predetermined angle by a lever 80 or an actuator is installed at the valve housing 75. The rotor 81 has first, second and third through-holes 82, 83 and 84 which connects the first and third connection passages 71 and 73, or the second and third connection passages 72 and 73 among the first, second and third connection passages 71, 72 and 73, when the rotor 81 is rotated. The first, second and third through-holes 82, 83 and 84 are formed to be spaced at an angle of 90° from each other, and the first, second and third connection passages 71, 72 and 73 are also formed to be spaced at an angle of 90°. A fourth through-hole 85 which is formed to be isolated from a portion having the first, second and third through-holes 82, 83 and 84 and to connect the fourth and fifth connection passages 76 and 77 is formed at an end side of the rotor 81. A reference numeral 88 which is not described is a cap.

In the car cleaner as described above, to suck the air and contaminants at the inner side of the car and thus to perform the cleaning operation, the lever 80 is operated so that the second connection passage 72 is in communication with the third through-hole 84, and the third connection passage 73 is in communication with the second through-hole 83, as illustrated in FIG. 3. At this time, the fourth connection passage 76 is rotated by the rotor 81. In this state, when the vacuum suction unit 40 is operated, the sucked air is discharged to the outside through the bypass passage 45b or the third switching valve 62 (referring to FIG. 3) via the suction and spray nozzle 31, the suction/discharge pipe 30, the collecting part 20, the connection duct 101, and the sucking part 41 of the vacuum suction unit 40. Therefore, the contaminants which contaminate the inner side of the car is sucked with the air through the above-mentioned route, and then collected by the collecting part 20.

And to spray the high pressure air through the suction and spray nozzle 31 and thus to perform the cleaning operation of the inner side of the car, the lever 80 is operated so that the first connection passage 71 is in communication with the first through-hole 82, and the third connection passage 73 is in communication with the third through-hole 84, and also the second connection passage 72 is blocked by the rotor 81, as illustrated in FIG. 4. In this process, the fourth connection passage 76 and the fifth connection passage 77 which sucks the external air are in communication with each other through the fourth through-hole 85.

When the vacuum suction unit 40 is operated, the air is sprayed to the outside through the first connection duct 102 of the discharging part 42, the suction/discharge pipe 30 and the suction and spray nozzle 31 via the fifth connection passage 77, the fourth through-hole 85, the fourth connection passage 76, the bypass passage 45b, the connection duct 101, and the sucking part 41 of the vacuum suction unit 40. At this time, some of the air which is not discharged through the first connection duct 102 may be discharged through the bypass passage 45b. Alternatively, as illustrated in FIG. 2, when the third switching valve 62 is installed at the discharging part 42, all of the air passing through the motor is supplied to the first connection duct 102.

Through the above-described operation, the inner side of the car may be cleaned by air sucking or spraying through the suction and spray nozzle 31 of the cleaner.

Figure 5:
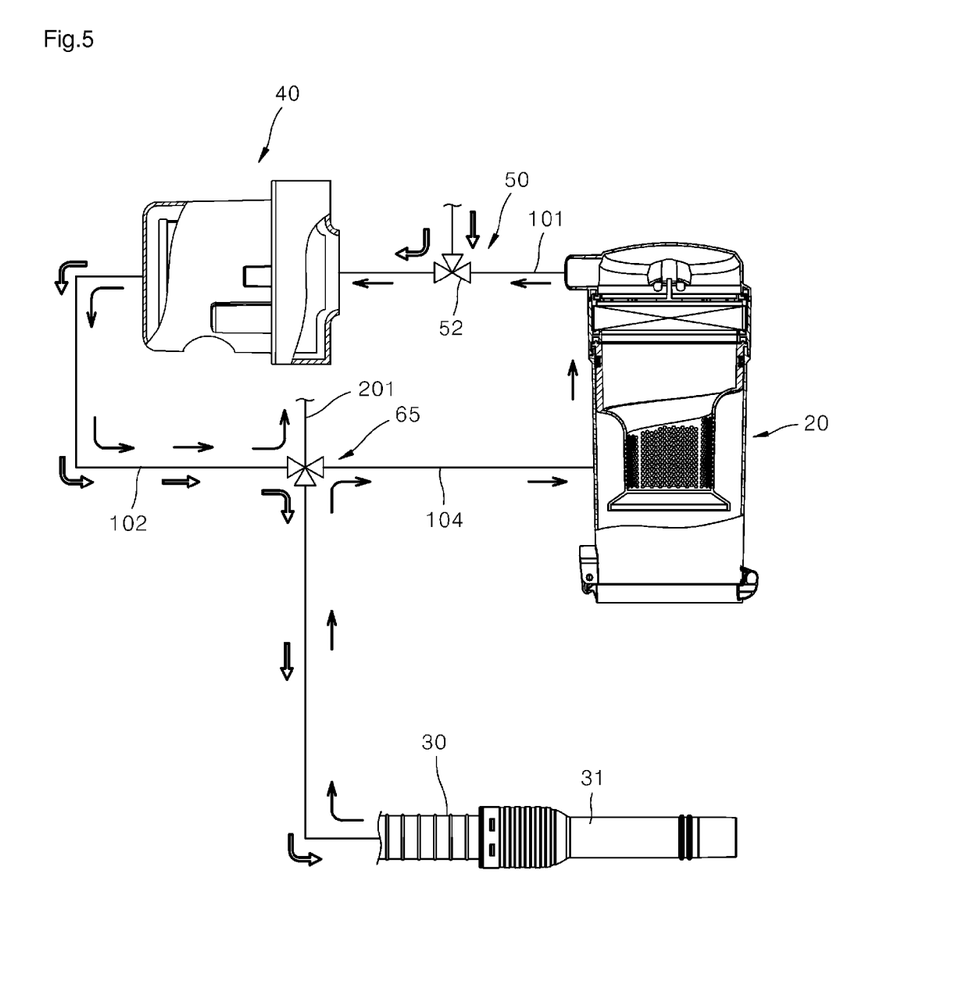
FIGS. 5 to 10 are views illustrating a car cleaner in accordance with still another embodiment of the present invention.

FIG. 5 illustrates a car cleaner in accordance with still another embodiment of the present invention. In the embodiment, the same reference numerals as those in the previous embodiment refer to the same elements.

Referring to the drawings, the cleaner 10 in accordance with the present invention includes the collecting part 20 which has the collecting space coupled with the main body of the cleaner to collect dust or foreign substances, the suction/discharge pipe 30 to which one side of the collecting part 20 is coupled so as to be in communication therewith, and which has the suction and spray nozzle 31 for transferring the dust or the foreign substances in the car to the collecting part 20, and the vacuum suction unit 40 having the sucking part 41 which is connected with the collecting part 20 to provide a suction force to the collecting part 20 and the discharging part 42 which discharges sucked air. The discharging part 42 and the suction/discharge pipe 30 are connected with each other through the first connection duct 102, and a 4-way valve as a fourth switching valve 65 is installed at a connection portion between the first connection duct 102 and the suction/discharge pipe 30.

Figure 6:
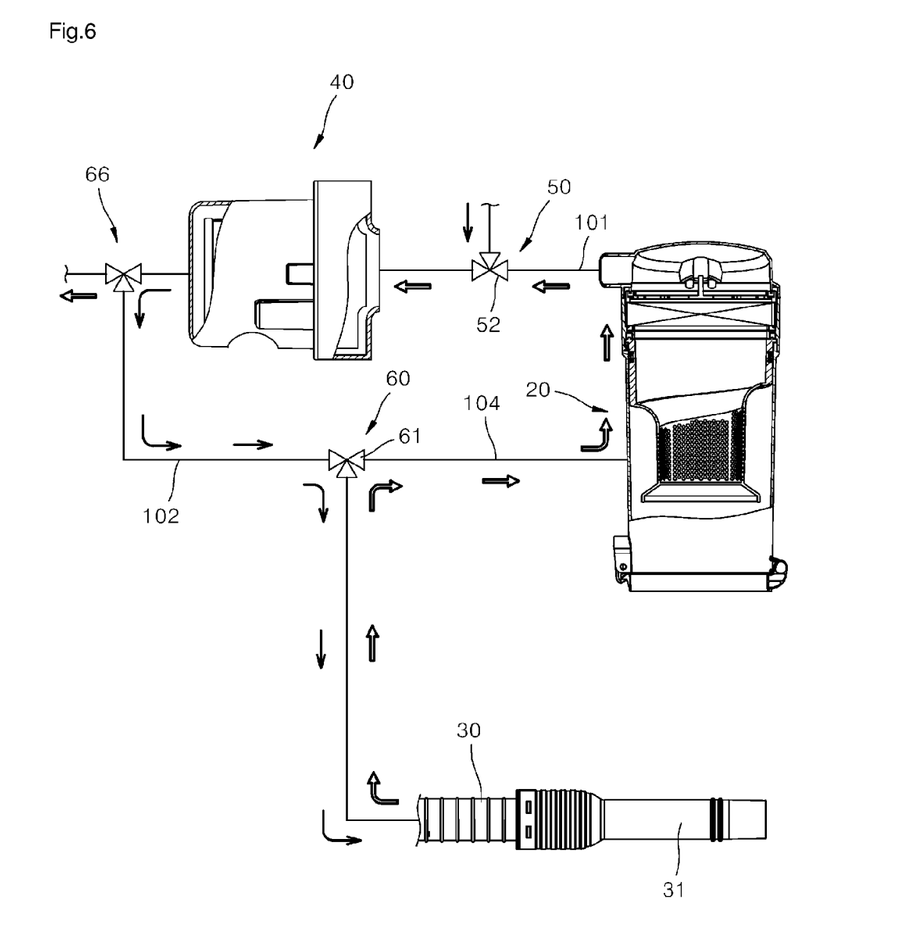

In still another embodiment, as illustrated in FIG. 6, the discharging part 42 and the suction/discharge pipe 30 are connected by the first connection duct 102, and a fifth switching valve 66 which discharges the air cooling the motor 45 and then discharged to the outer side or allows the air to flow to the first connection duct 102 is installed at a connection portion between the first connection duct 102 and the discharging part 42. The fifth switching valve 66 may be a 3-way valve.

In the above-described embodiment, to use the car cleaner as the vacuum cleaner, the fourth switching valve 65 is operated so that the suction/discharge pipe 30 connected with the fourth switching valve 65 is in communication with the second connection duct 104 configured to connect the fourth switching valve 65 and the collecting part 20, and the first connection duct 102 configured to connect the discharging part 42 of the vacuum suction unit 40 and the fourth switching valve 65 is in communication with a discharging pipe 201 connected with the fourth switching valve 65 (Referring to FIG. 5).

The suction force generated by the operation of the vacuum suction unit 40 is discharged through the suction and spray nozzle 31, the suction/discharge pipe 30, the fourth switching valve 65, the collecting part 20, the sucking part 41, the first connection duct 102 and the discharging pipe 201 of the fourth switching valve 65. The foreign substances contained in the air sucked in this process are collected by the collecting part 20.

To spray the air through the suction and spray nozzle 31, the connection duct of the collecting part 20 should be blocked using the first switching valve, and the sucking part 41 should be in communication with the outer side so as to suck the external air. And the first connection duct 102 and the suction/discharge pipe 30 should be connected with each other using the fourth switching valve 65. Therefore, the external air is sucked to the sucking part 41 through the first switching valve 52 by the operation of the vacuum suction unit 40, and then sprayed to the outside through the first connection duct 102, the suction/discharge pipe 30 and the suction and spray nozzle 31.

In the vacuum cleaner illustrated in FIG. 6, when the air is sucked through the suction and spray nozzle 31, the sucked air is discharged to the outside using the fifth switching valve 66, and when the air is discharged through the suction and spray nozzle 31, the air sucked to the sucking part 41 through the first switching valve 52 is supplied to the suction/discharge pipe 30 through the first connection duct 102 configured to connect the discharging part 42 and the suction/discharge pipe 30 (Referring to FIG. 6).

Figure 7:
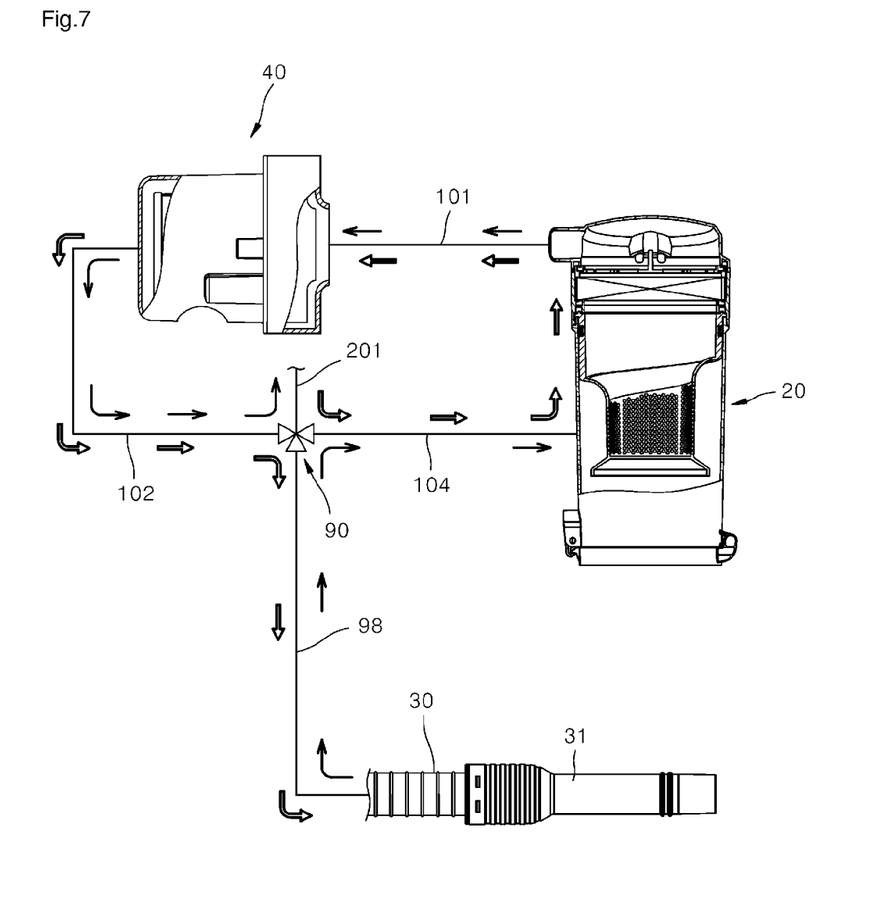

FIG. 7 illustrates a car cleaner in accordance with yet another embodiment of the present invention. In the embodiment, the same reference numerals as those in the previous embodiment refer to the same elements.

Referring to the drawings, in the cleaner 10 in accordance with the present invention, the air which is sucked or sprayed through the suction and spray nozzle 31 passes through the collecting part 20. The cleaner 110 includes the collecting part 20 which has the collecting space coupled with the main body of the cleaner to collect dust or foreign substances, the suction/discharge pipe 30 to which one side of the collecting part 20 is coupled so as to be in communication therewith, and which has the suction and spray nozzle 31 for transferring the dust or the foreign substances in the car to the collecting part 20, and the vacuum suction unit 40 having the sucking part 41 which is connected with the collecting part 20 to provide the suction force to the collecting part 20 and the discharging part 42 which discharges sucked air. The discharging part 42 and the suction/discharge pipe 30 are connected with each other through the first connection duct 102, and a sixth switching valve 90 is installed at a connection portion between the first connection duct 102 and the suction/discharge pipe 30. The sixth switching valve 90 may be a 4-way valve.

In the car cleaner having the above-described structure, to perform the cleaning operation of the inner side of the car, the sixth switching valve 90 as the 4-way valve is operated so that the suction/discharge pipe 30 connected with the sixth switching valve 90 is in communication with the second connection duct 104 configured to connect the sixth switching valve 90 and the collecting part 20, and the first connection duct 102 configured to connect the discharging part 42 of the vacuum suction unit 40 and the sixth switching valve 90 is in communication with the discharging pipe 201 connected with the sixth switching valve 90 (Referring to FIG. 7).

In this state, when the vacuum suction unit 40 is operated, the suction force generated by the vacuum suction unit 40 is discharged through the suction and spray nozzle 31, suction/discharge pipe 30, the sixth switching valve 90, the collecting part 20, the sucking part 41, the first connection duct 102 and the discharging pipe 201 of the sixth switching valve 90. The foreign substances contained in the air sucked in this process are collected by the collecting part 20.

To spray the air through the suction and spray nozzle 31, the sixth switching valve 90 is operated so that the discharging pipe 201 is connected with the second connection duct 104, and the first connection duct 102 connected with the discharging part 42 is connected with the suction/discharge pipe 30. In this state, when the vacuum suction unit 40 is operated, the external air sucked through the discharging pipe 201 is sprayed through the sixth switching valve 90, the second connection duct 104, the collecting part 20, the connection duct 101, the sucking part 41 of the vacuum suction unit 40, the discharging part 42, the first connection duct 102, the sixth switching valve 90, the suction/discharge pipe 30 and the suction and spray nozzle 31. Therefore, the cleaning operation of the inner side of the car may be performed using the air sucked or sprayed through the suction and spray nozzle 31.

Figure 8:
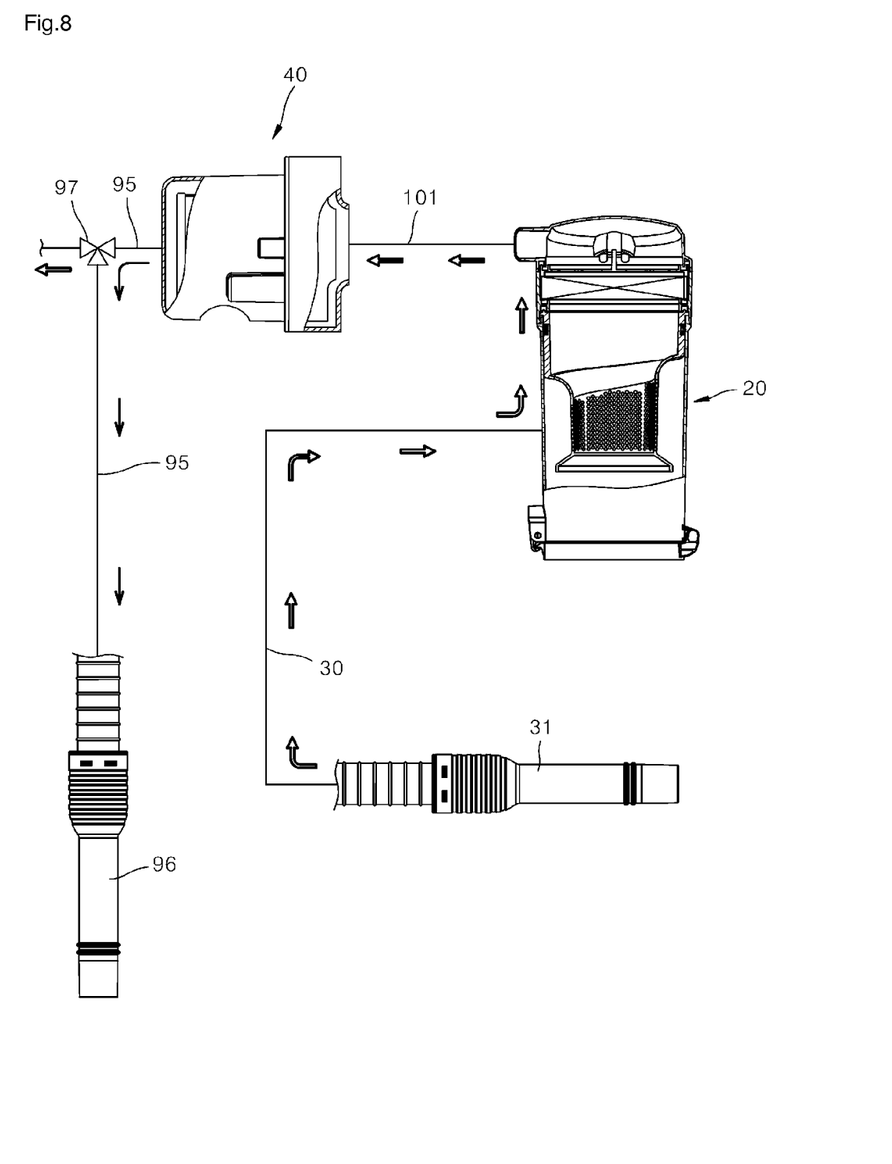
Figure 9:
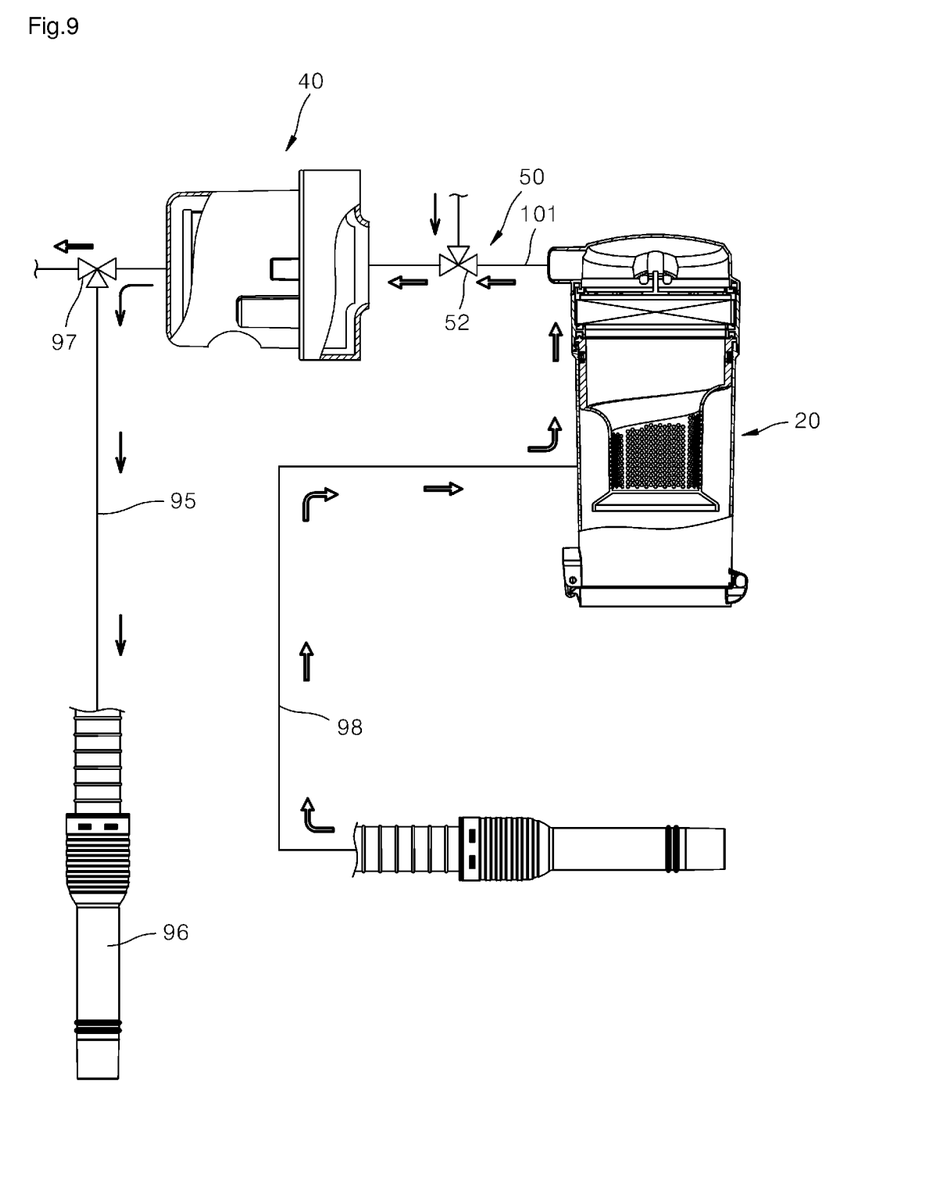

FIGS. 8 and 9 illustrate a car cleaner in accordance with yet still embodiment of the present invention. In the embodiment, the same reference numerals as those in the previous embodiment refer to the same elements.

As illustrated in FIG. 9, a separate discharging pipe 95 may be connected to the discharging part 42 of the vacuum suction unit 40, and a spray nozzle 96 may be installed at an end thereof. In this case, a seventh switching valve 97 which selectively connects the discharging part 42 and the discharging pipe 95 with the outside may be installed at the discharging part 42, and the first switching valve 52 which introduces the external air to the connection duct 101 may be also installed.

As described above, since the vacuum cleaner has a sucking pipe 98 and the discharging pipe 95 which are separately provided, the air which is discharged through the seventh switching valve 97 and the discharging part 42 may be supplied to the discharging pipe 95 and then sprayed. Since the cleaner may suck the air through the sucking pipe 98, and also may discharge the air through the discharging pipe 95, the cleaning operation of the inner side of the car may be performed easily.

Figure 10:
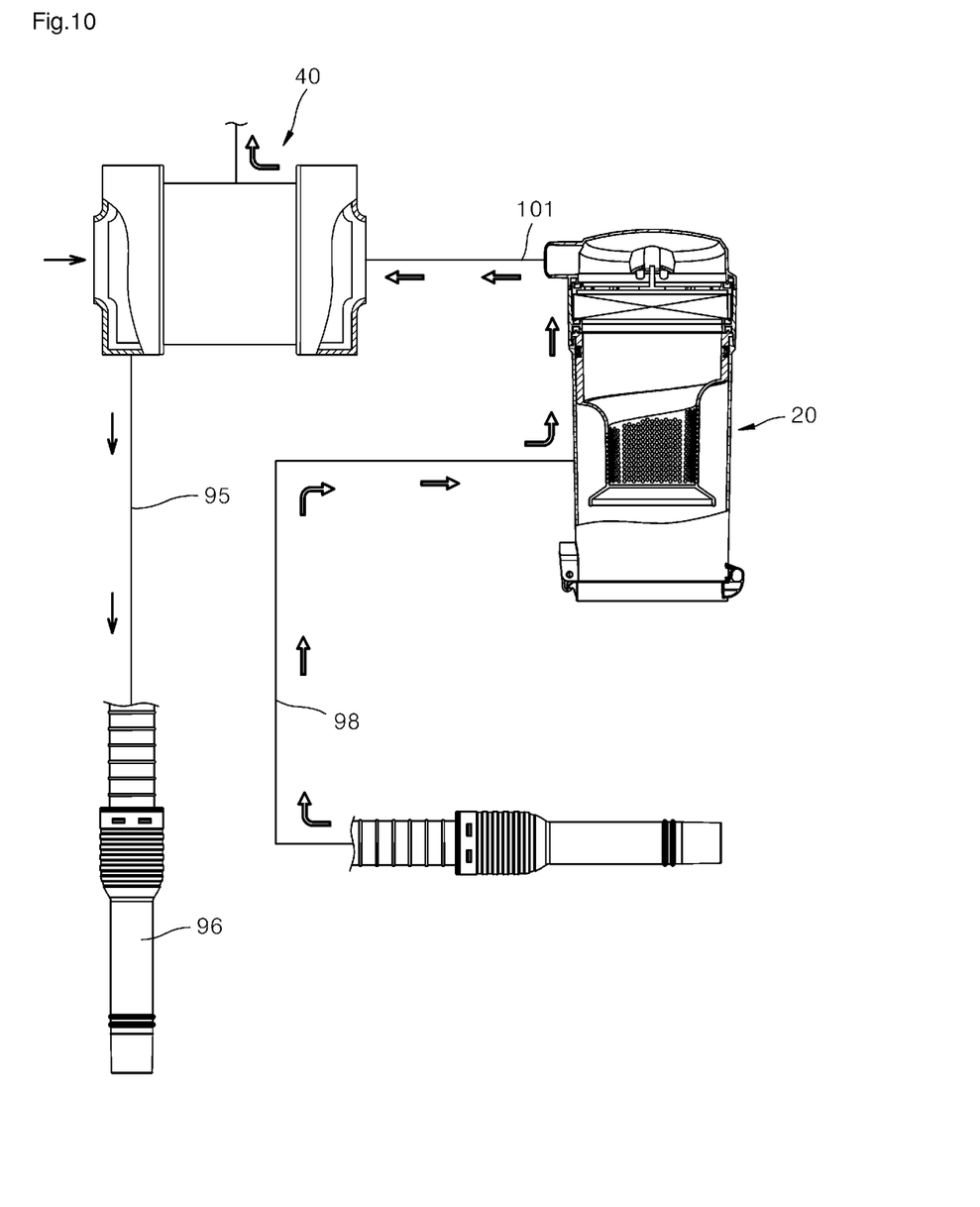

And in the vacuum cleaner, as illustrated in FIG. 10, one vacuum suction unit has an impeller installed at both ends of a rotating shaft of one motor to blow the air, and a sucking pipe 98 and a discharging pipe 95 which are installed thereat, respectively.

As described above, the car cleaner in accordance with the present invention may be installed at the car to suck and spray the air through the suction and spray nozzle, and thus a cleaning area of the cleaner may be enlarged.

The car cleaner in accordance with the present invention can suck the dust or the foreign substances in the car and also can blow away the dust accumulated at the corner or in the gap, thereby effectively removing the dust.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A car cleaner comprising:
a collecting part having a collecting space to collect dust or foreign substances;
a suction and spray nozzle configured to suck the dust or the foreign substances in a car and transfer to the collecting part or to discharge air to an outside of the car cleaner, selectively;
a suction/discharge pipe connecting the suction and spray nozzle to the collecting part;
a vacuum suction unit provided with an impeller and a motor to provide a suction force or a blowing force to the suction and spray nozzle, a sucking part configured to suck in air, and a discharging part configured to discharge sucked air;
a first connection duct connecting the collecting part to the sucking part of the vacuum suction unit;
an external air suction switching unit installed in the first connection duct and configured to provide a first air flow pass from the collecting part to the sucking part of the vacuum suction unit or from the outside of the car cleaner to the sucking part of the vacuum suction unit, selectively; and
a suction/discharge switching unit provided with a second connection duct connecting the discharging part of the vacuum suction unit to the suction/discharge pipe and configured to provide a second air flow pass from the suction and spray nozzle to the collecting part or from the discharging part of the vacuum suction unit to the suction and spray nozzle, selectively,
wherein the suction/discharge switching unit is separated from the external air suction switching unit,
wherein the vacuum suction unit is provided with a bypass passage to discharge air to the outside of the car cleaner adjacent to the discharging part of the vacuum suction unit, and the bypass passage discharges air to the outside of the car cleaner during both the suction and spray nozzle sucking in air and blowing out air.

* * * * *